United States Patent [19]

Charkey

[11] 4,415,636

[45] Nov. 15, 1983

[54] SECONDARY BATTERIES HAVING A ZINC NEGATIVE ELECTRODE

[75] Inventor: Allen Charkey, Brookfield, Conn.

[73] Assignee: Energy Research Corporation, Danbury, Conn.

[21] Appl. No.: 261,375

[22] Filed: May 7, 1981

Related U.S. Application Data

[63] Continuation of Ser. No. 165,458, Feb. 24, 1978, abandoned, which is a continuation of Ser. No. 759,127, Jan. 13, 1977, abandoned, which is a continuation-in-part of Ser. No. 606,866, Aug. 22, 1975, Pat. No. 4,022,953.

[51] Int. Cl.$^3$ .............................................. H01M 4/00
[52] U.S. Cl. ...................... 429/27; 429/219; 429/223; 429/229
[58] Field of Search .................. 429/27, 222, 229–231, 429/219, 223

[56] References Cited

U.S. PATENT DOCUMENTS

| | | | |
|---|---|---|---|
| 2,942,052 | 6/1960 | Bourke et al. | 429/91 |
| 3,208,880 | 9/1965 | Bode | 429/206 |
| 3,873,367 | 3/1975 | Kandler | 429/229 |
| 3,881,959 | 5/1975 | Tsuchida et al. | 429/27 |
| 3,923,544 | 12/1975 | Berchielli | 429/219 |
| 4,003,754 | 1/1977 | Winsel et al. | 429/222 X |
| 4,037,033 | 7/1977 | Takamura et al. | 429/206 |

*Primary Examiner*—Charles F. LeFevour

[57] ABSTRACT

Batteries having a positive electrode and a negative electrode containing zinc and cadmium matter. The cadmium matter is an additive enhancing adherence of the negative electrode for zinc electroreduced from solid zinc compound state or deposited thereon from electrolytes. The zinc matter and the active material of the positive electrode are employed in quantities such that the cadmium matter is maintained electrochemically inactive with respect to the active material of the positive electrode in battery discharging.

12 Claims, 2 Drawing Figures

SECONDARY BATTERIES HAVING A ZINC NEGATIVE ELECTRODE

This is a continuation, of application Ser. No. 165,458, filed Feb. 24, 1978 now abandoned which application is a continuation of application Ser. No. 759,127 filed on Jan. 13, 1977 now abandoned, which application is a continuation-in-part of application Ser. No. 606,866 filed on Aug. 22, 1975, now U.S. Pat. No. 4,022,953.

FIELD OF THE INVENTION

This invention relates to secondary batteries having negative electrodes including zinc material.

BACKGROUND OF THE INVENTION

Silver-zinc, nickel-zinc and oxygen(air)-zinc alkaline batteries have not, in embodiments known prior to the invention in the above-identified patent application, satisfied the need of the battery industry to provide a secondary battery of these types suitable for use in powering electric vehicles and in end uses of like demand. These uses require deep (65%) discharge-recharge cycling capacity in the order of three hundred cycles or more, a figure of merit not attained in such previously known zinc-containing secondary batteries.

The inability of previous known zinc alkaline batteries to meet such cycling capability is believed to be based principally on limitations of their negative electrodes. Thus, zinc active material electrodes known prior to the invention in the above-identified patent application fail to repetitively provide uniform surface adherence for zinc electroreduced from the solid zinc compound state or deposited thereon from the electrolyte. This observation of applicant is appreciated in some measure in Morrison United States reissue patent Re. 13,174 wherein it is noted, as introduction to the invention therein, that electrodes not originally including zinc active material fail to retain zinc deposited thereon from alkaline electrolytes containing zinc on repetitive discharge-recharge cycling. While some improvement in short term cycling is noted in this reissue patent on pre-plating cadmium or silver on the electrode and amalgamating it to form a surface suitable to receive the zinc, it is reported that electrolyte need be employed with such modified electrode in quantity exceeding that necessary to do the work involved. In its solution to the problem, this reissue patent departs from such use of cadmium plating, stated to be impractical, and discloses a mechanical electrode structure involving multiple wire screens to provide a retention bed for zinc active material.

SUMMARY OF THE INVENTION

The present invention has as its object the provision of improved secondary batteries having zinc negative electrodes.

A more particular object of the invention is to provide batteries of the foregoing type having electrodes fabricated with zinc matter and exhibiting improved adherence for zinc deposited thereon from an electrolyte to meet present demands for extended deep discharge-recharge cycling capacity in secondary batteries.

In attaining these and other objects, the invention provides batteries having a positive electrode with active material and a negative electrode containing zinc matter and particulate cadmium or cadmium compounds dispersed therein. The positive electrode active material and zinc matter are selected in respective quantities such that the positive electrode active material is electrochemically depleted prior to electrochemical depletion of the zinc matter in discharging of the battery. As a result of such quantity preselection, the cadmium matter is maintained electrochemically inactive with respect to the positive electrode active material in battery discharge. The terminal voltage of batteries following the invention accordingly is established in the course of discharge by the zinc matter and positive electrode active material and does not exhibit a voltage step attributable to electrochemical involvement of the positive electrode active material and the cadmium matter. Secondary batteries in accordance with the invention exhibit deep discharge-recharge cycling capacity in excess of three hundred cycles. It is believed that the cadmium additive employed as prescribed by applicant greatly improves electrode surface morphology to retain zinc electroreduced from the solid zinc compound state or deposited thereon from solution and provides the basis for the improved secondary battery performance.

The foregoing and other features of the invention will be evident from the drawings and from detailed description of preferred embodiments of batteries and electrode structures set forth below, following the ensuing discussion of additional patents considered in preparing the subject application.

Additional Patents

Morrison U.S. Pat. No. 945,243 seeks after electrode structure which both (1) retains a sufficient quantity of mercury in an electrode having such as a copper support to prevent hydrogen evolution by reason of local action between the copper support and zinc deposited on the electrode and (2) limits penetration of the mercury into the support as would render the support brittle. In reconciling these seemingly competing interests, the patent provides for applying an amalgam-holding or absorptive coating of cadmium on the support of character preventing penetration of mercury into the support. The cadmium layer is deposited on the support by electrolysis and, accordingly, dispersed particulate cadmium metal is not considered. Further, zinc material is not a constituent of the electrode as assembled but is deposited thereon initially from the battery electrolyte.

Werner U.S. Pat. No. 623,195 relates to a battery having lead peroxide active material and a thin metal sheet positive electrode. The electrode is electroplated with an alloy formed of magnesium and cadmium with zinc. The use of unalloyed cadmium metal or cadmium compounds is not considered nor are dispersed metallic cadmium particles considered.

Drumm et al. U.S. Pat. No. 2,013,379 provides an electrode support for retaining zinc electroplated thereon from solution. The electrode support is comprised of either an iron-nickel or iron-cobalt alloy, optionally further alloyed with various metals including cadmium. Original electrode structure including zinc active material is not considered nor are dispersed metallic cadmium particles considered.

In Bourke et al. U.S. Pat. No. 2,942,052 negative electrodes of selected cells of a multiple cell battery include plural active materials, such as zinc and cadmium in such relative weight proportions (cadmium being at least 25 percent of the electrode weight) that the selected cells yield a measurable output voltage change during discharge upon transition from zinc to cadmium as the material being electrochemically converted. In composing the electrode, the plural active materials may be physically unmixed, indicating the lack of concern for composite zinc-cadmium electrode surface morphology. Further, the patent does not consider metallic cadmium particle characteristics in electrode fabrication.

Bode U.S. Pat. No. 3,208,880 relates to secondary batteries of type having cadmium compounds as the active material of their negative electrode. To effect a discharge reserve in the negative electrode, i.e., to insure that the positive electrode will expire before the negative electrode, the patent introduces zinc in amount up to 5.0 percent by equivalent weight of the charge accepting capacity of the cadmium compound. Being electrochemically more negative than cadmium, the zinc additive is oxidized to zinc oxide at the outset of battery use in turn converting the cadmium compound to cadmium metal and providing the desired discharge reserve. The capacity of the negative electrode for providing adherence for then electrochemically inactive zinc is of no concern in the subsequent conversion of the cadmium active material. Further, in composing the electrode, the zinc additive may be spatially separate from the cadmium compound.

Kramer et al. U.S. Pat. No. 3,847,668, commonly assigned with the referenced Bode patent is of related nature, pertaining to the creation of a reserve both in a cadmium electrode by addition of zinc thereto in the form of a spatially separate sheet member and further to the use of zinc together with an alkaline electrolyte to provide for the reduction of the anti-polar matter of the battery positive electrode. As in the Bode patent, the resulting battery is one having a predominantly cadmium negative electrode not exhibiting particular adherence for zinc issuing from the electrolyte.

As will be noted from detailed study thereof, those of the foregoing patents which consider negative electrode structure originally constructed of zinc and cadmium matter do not contemplate measures for maintaining the cadmium matter electrochemically inactive with respect to the active material of a positive battery electrode.

DETAILED DESCRIPTION OF THE PREFERRED EMBODIMENTS

Figure 1:
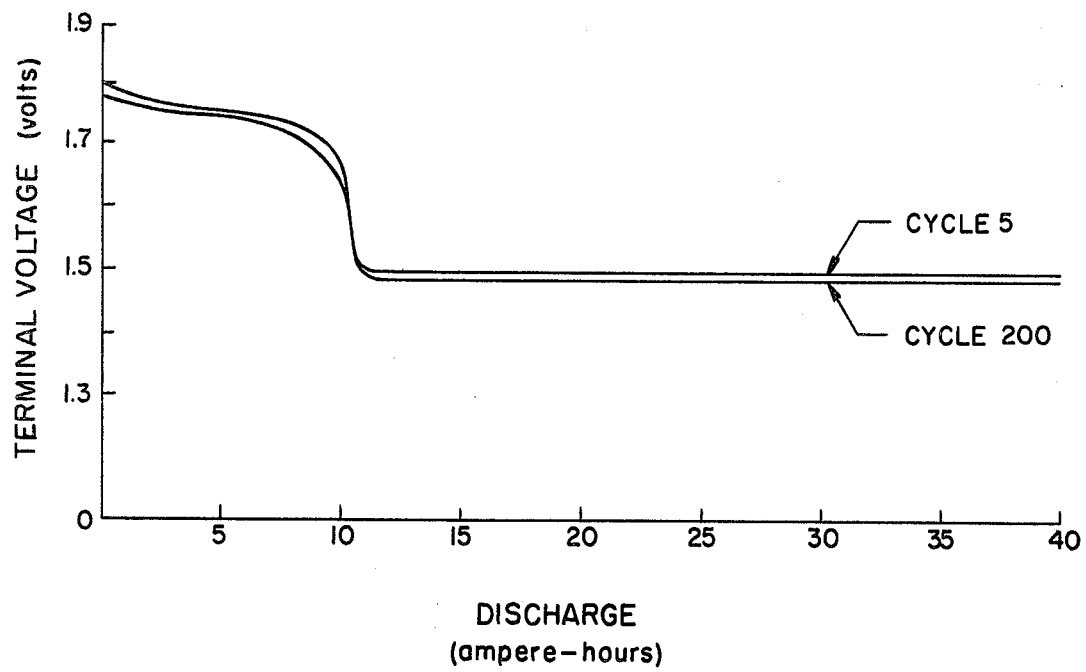
FIG. 1 shows typical discharge curves for a silver-zinc alkaline secondary battery constructed in accordance with the invention.

In a particularly preferred embodiment of a battery in accordance with the invention, a negative electrode includes admixed zinc oxide, cadmium oxide and a binder therefor, such as polytetrafluoroethylene (PTFE). The resulting mixture is kneaded to a dough-like consistency with the assistance of a non-aqueous lubricant. The kneaded mixture is then rolled to form continuous sheets in the range of thickness of from 10 to 100 mils, and preferably from 30 to 50 mils. The lubricant is next removed from the sheet, providing a flexible porous sheet of PTFE containing zinc oxide and cadmium oxide.

Cadmium oxide and PTFE are now separately admixed and this mixture is kneaded to a dough-like consistency with the assistance of a non-aqueous lubricant. The kneaded mixture is then rolled to form continuous sheets in the range of thickness of from 2.0 to 20 mils, and preferably from 2.0 to 5.0 mils.

A sandwich negative electrode structure is now fabricated, first by applying a cadmium oxide-PTFE sheet, made as above-discussed, to each of the opposed sides of a metallic foil current collector, for example, a solid copper foil of 2.0 mils thickness and then by applying a zinc oxide-cadmium oxide-PTFE sheet, made as above-discussed, to the exposed surface of each of the cadmium oxide-PTFE sheets on the current collector.

In the foregoing practice, the cadmium oxide may be a commercially available powder known as ASARCO cadmium oxide. The zinc oxide may be the commercially available powder known as New Jersey zinc oxide, designated U.S.P. 12. The PTFE may be a powder commercially available as Dupont Teflon powder No. 6C. A suitable solvent is commercially available as Shell Sol V, a petroleum solvent having a gravity of 70.8 APT, an aniline point of 129° F., and a composition by volume of 65.5 percent paraffins, 32 percent napthene and 2.5 percent aromatics. Such solvent is used in amount about 50 to 90 percent by weight of the total weight of the solids in the mixtures.

Cadmium oxide is preferably employed in the electrode structure in an amount by weight of from 1.0 to 10 percent of the weight of the zinc active material. In the particular practice under discussion, the cadmium oxide is 5.0 percent by weight of the total weight on the solids in the zinc oxide-cadmium oxide-PTFE sheets and the PTFE weight is 2.5 percent of the total weight of the solids in these sheets. An equal amount by weight of cadmium oxide is employed in the cadmium oxide-PTFE sheet, with the PTFE weight thereof being 2.0 percent of its cadmium oxide weight. Depending on selected thickness of the latter sheets, the weight of cadmium oxide therein may be as low as 15 percent by weight of the cadmium oxide in the zinc oxide-cadmium oxide-PTFE sheets. As mentioned above, the total weight of the cadmium addition to the entire electrode structure is preferably from 1.0 to 10 percent of the weight of the zinc active material.

To attain preferred surface morphology for the negative electrode structure, the particle size and surface area of the cadmium oxide is desirably selected such that the metallic cadmium particles situate in the electrode structure upon conversion of the cadmium oxide exhibit particle size not greater than 10 microns and have surface area not less than 1.0 square meters per gram. Metallic cadmium powder may be employed as the starting material in place of cadmium oxide, in which case starting material particle size and surface area selection are made directly within the above-stated limits. Where either cadmium oxide powder or cadmium hydroxide powder, both less dense than metallic cadmium powder, is employed as the starting material, particle size and surface area parameters for the starting material are increased by from 20 to 30 percent above from the stated limits to insure that the metallic cadmium particles in the electrode structure upon conversion of the starting material cadmium compound exhibit such preferred particle size and surface area.

Electrode structure so fabricated, with zinc oxide active material in the amount of 130 grams, is employed as the negative electrode in an alkaline battery having as its positive electrode a silver plate containing 140 grams of silver active material. An aqueous electrolyte having 40 percent potassium hydroxide is employed and the negative and positive electrodes are separated by three layers of commercially available Union Carbide fibrous sausage casing cellulosic separator material. The battery is subjected to discharge-recharge cycling wherein it is discharged at 8.0 amperes for 5.0 hours to remove 40 amperehours of the cell capacity and is then charged at 2.5 amperes to 2.0 volts.

In initial charging, the cadmium oxide is converted to cadmium metal since it is electrochemically more positive than zinc. The cadmium metal is thereafter inert since it does not participate in electrochemical oxidation or reduction in the potential region for oxidation and reduction of the zinc active material during battery discharging.

The electrochemical equations applicable during discharge are:

$$2AgO + H_2O + 2e \rightarrow Ag_2O + 2OH^- \qquad (1)$$

$$Ag_2O + H_2O + 2e \rightarrow 2Ag + 2OH^- \qquad (2)$$

$$Zn + 2OH^- \rightarrow Zn(OH)_2 + 2e \qquad (3)$$

As is seen in FIG. 1, which shows typical discharge curves for a battery having a negative electrode constructed in accordance with the invention, equation (1) and (2) apply initially in the course of battery terminal voltage drop from 1.8 volts to 1.5 volts with equation (3) applicable thereafter. The discharge cycle in FIG. 1 is terminated when 40 ampere-hours are removed. The two discharge cycles illustrated, i.e., at five cycles and at two hundred cycles are substantially identical. Equations (1)–(3) are reversible, the reversed version thereof being applicable during charging.

Figure 2:
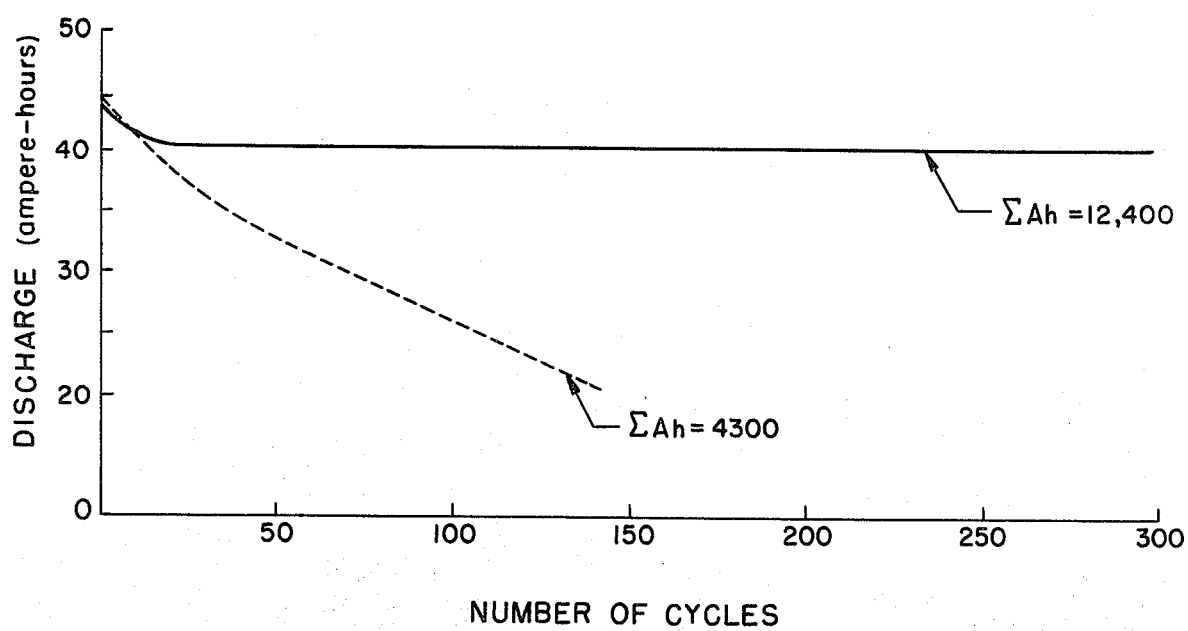
FIG. 2 shows curves indicative of ampere-hour capacities of a battery constructed in accordance with the invention and a comparison battery otherwise constructed.

Referring to FIG. 2, the solid line curve therein shows the ampere-hours capacity of the above-discussed battery in the course of cycling thereof in excess of three hundred cycles. The battery yields its rated 40 ampere-hours throughout such cycling. Initially and after each of the first, second and third hundred cycles, the battery is maintained on discharge until its terminal voltage drops below 1.5 volts to 1.3 volts, i.e., by continuing to draw 8.0 amperes therefrom for about 0.5 hour beyond the normal 5.0 hour discharge time. On initial discharge, the battery yields 44.5 ampere-hours. After the one-hundredth cycle, 43.5 ampere-hours are drawn from the battery on such discharge to 1.3 volts. After the two-hundredth and three-hundredth cycle, 41.5 and 42 ampere-hours, respectively, are removed on such discharge to 1.3 volts, with the battery continuing to provide its rated capacity in full during subsequent typical discharge cycles.

To provide a basis for evaluating the performance of this cadmium-additive battery, FIG. 2 further shows a broken line curve illustrating the discharge cycling capacity of a comparison battery differing from the cadmium-additive battery solely in respect of its negative electrode. The comparison battery negative electrode is prepared from a mixture containing 2.0 percent by weight of mercuric oxide, 2.5 percent by weight of PTFE and the remainder zinc oxide. With addition of a lubricant, as above-discussed in preparation of the negative electrode structure of the cadmium-additive battery, this mixture is kneaded and rolled to a thickness of 30 to 50 mils and pressed onto a solid foil copper collector.

With an initial ampere-hour capacity as shown in FIG. 2, the comparison cell is subjected to the same discharge-recharge cycling as in the cadmium-additive battery, except for the practice of discharge of the latter to 1.30 volts initially and then after each one hundred cycles. As shown in FIG. 2, the comparison battery ampere-hour yield deteriorates continuously throughout such cycling, the battery yielding but twenty ampere-hours after somewhat less than one hundred and fifty cycles.

The inability of the comparison battery to provide its rated ampere-hour output on repetitive discharge and recharge is attributable to the inability of its zinc electrode to provide suitable adherence for zinc electroreduced from the solid zinc compound state or deposited thereon from the electrolyte. In the cadmium-additive battery constructed in accordance with the invention, cadmium metal is believed to be situate in the negative electrode in manner and form providing conductive nucleation sites for uniform zinc electroreduction or deposition from solution as evidenced by the results attained in FIGS. 1 and 2. These results are believed to be realized based on the use of particulate cadmium matter and in that the cadmium additive is introduced in the electrode structure in dispersed particulate configuration as contrasted with electroplating or electrodeposition thereof on the electrode structure as alluded to in the Morrison reissue patent above-discussed. In the multiple layer electrode structure of the invention considered to this juncture, the addition of cadmium to the current collector by laminating the collector with the PTFE-cadmium oxide sheets provides electrically conductive nucleation sites for uniform zinc deposition on the collector. The addition of cadmium to the zinc active material by dispersion of particulate cadmium therein provides electrochemically inert electrically conductive nucleation sites for individual zinc particles.

The preferred surface morphology of the electrode structure in accordance with the invention may be provided by practices other than that providing the foregoing PTFE-bound multiple layer configuration. Thus, cadmium/cadmium compound powder having the above-discussed surface area and size characteristics may be doctored or otherwise evenly mechanically spread onto the current collector and the zinc oxide powder pressed over the cadmium/cadmium compound. On initial charging, the cadmium metal is then sufficiently attached to both the current collector and the zinc oxide to provide an electrode structure having improved adherence for zinc electroreduced from the solid zinc compound state or deposited from solution.

While particulate cadmium metal, cadmium oxide, cadmium sulfate and cadmium hydroxide are among cadmium matters employable in practicing the invention, cadmium oxide powder is preferred since it yeilds the highest surface area for the cadmium metal additive and is more economical than the other referenced cadmium matters.

As noted above, the cadmium matter of the negative electrode is electrochemically inactive with respect to the active material of the positive electrode during battery discharge. This aspect of the invention is achieved by preselecting the quantities of zinc material and positive electrode active material such that the latter is electrochemically depleted in discharge prior to electrochemical depletion of the zinc material. This practice will be further understood from the additional examples now set forth.

A silver-zinc cell is fabricated with a plurality of positive and negative plates such that the theoretical positive capacity is 77Ah and the theoretical negative capacity is 122Ah. The negative plates contain the cadmium additive at a theoretical capacity of 6.7Ah. The cell is filled with 45% KOH and initially charged at 4 amperes to an end voltage of 2.02 volts with a resultant input of 62Ah. The cell is then discharged at 8 amperes to a final voltage of 1.30 volts with a resultant output of 53Ah. A zinc wire reference electrode inserted in the cell shows that the positive plate capacity limits the discharge at 1.30 volts and is depleted.

These results show that there is a reserve capacity of 9Ah of charged zinc and 6.7Ah of charged cadmium remaining at the end of the cycle. On subsequent cycles the cell is discharged at 8 amperes for 5 hours which removes 40Ah per cycle, increasing further the charge reserve of zinc to 22Ah while the 6.7Ah of charged cadmium remains constant.

A nickel-zinc cell is fabricated with a plurality of positive and negative plates such that the theoretical positive capacity is 38Ah and the theoretical negative capacity is 80Ah. The negative plates contain the cadmium additive at a theoretical capacity of 4.4Ah. The cell is filled with 35% KOH containing 1% LiOH and initially charged at 2.5 amperes for 17 hours with a resultant input of 42.5Ah. The cell is then discharged at 6 amperes to a final voltage of 1.35 volts with a resultant output of 32Ah. A zinc wire reference electrode inserted in the cell shows that the positive plate capacity limits the discharge at 1.35 volts and is depleted.

These results show that there is a reserve capacity of 10.5Ah of charged zinc and 4.4Ah of charged cadmium remaining at the end of the cycle. On subsequent cycles the cell is discharged at 6 amperes for 4.17 hours which removes 25Ah per cycle, increasing further the charge reserve of zinc to 17Ah while the 4.4Ah of charged cadmium remains constant.

An air-zinc cell is fabricated with 2 oxygen (air) electrodes and one zinc electrode containing 25Ah of theoretical zinc capacity. The zinc electrode contains the cadmium additive at a theoretical capacity of 1.4Ah. The cell is filled with 35% KOH and initially charged at 1.25 amperes for 16 hours with a resultant input of 20Ah. The cell is then discharged at 4 amperes to 1.00 volts with a resultant output of 16Ah.

These results show that there is a reserve capacity of 4Ah of charged zinc and 1.4Ah of charged cadmium remaining at the end of the cycle. On subsequent cycles the cell is discharged at 4 amperes for 3 hours which removed 12Ah per cycle, increasing further the charge reserve of zinc to 8Ah while the 1.4Ah of charged cadmium remains constant.

Various changes and modifications to the foregoing embodiments and practice will now be evident to those skilled in the art and may be introduced without departing from the invention. Thus, the invention encompasses batteries other than the discussed silver-zinc, nickel-zinc and oxygen(air)-zinc batteries. The true spirit and scope of the invention is set forth in the following claims.

What is claimed is:

1. A battery having a positive electrode including active material and a negative electrode including zinc material and cadmium particulate matter dispersed in said zinc material, said battery being constructed with such positive electrode active material and said zinc material in quantities such that said positive electrode active material is electrochemically depleted prior to electrochemical depletion of said zinc material in discharging of said battery, whereby said cadmium particulate matter is electrochemically inactive with respect to said positive electrode active material in such battery discharging, said negative electrode including: an electrically conductive support, a first layer overlying said conductive support and comprised of said cadmium particulate matter and a first binder therefor and a second layer overlying said first layer and comprised of said zinc material, said cadmium particulate matter and a second binder therefor.

2. The battery claimed in claim 1 wherein said positive electrode active material is silver matter.

3. The battery claimed in claim 1 wherein said positive electrode active material is nickel matter.

4. The battery claimed in claim 1 wherein said positive electrode is an oxygen electrode.

5. The battery claimed in claim 1 wherein said cadmium particulate matter is selected from the group consisting of (a) metallic cadmium having particle size of not greater than 10 microns and surface area not less than 1.0 square meters per gram, (b) a cadmium compound electrochemically convertible to metallic cadmium having particle size of not greater than 10 microns and surface area not less than 1.0 square meters per gram and (c) mixtures of said metallic cadmium and said cadmium compound.

6. The battery claimed in claim 1 wherein said particulate cadmium matter is cadmium oxide.

7. The battery claimed in claim 6 wherein said zinc material is zinc oxide.

8. The battery claimed in claim 7 further including a binder for said cadmium oxide and said zinc oxide.

9. The battery claimed in claim 1 wherein said particulate cadmium matter is cadmium hydroxide.

10. The battery claimed in claim 1 wherein said first and second binders comprise polytetrafluoroethylene.

11. The battery claimed in claim 1 wherein the weight of said particulate cadmium matter therein is from 1.0 to 10 percent of the weight of said zinc material.

12. The battery claimed in claim 1 wherein said particulate cadmium matter is cadmium sulfate.

* * * * *